United States Patent
Pierce

(10) Patent No.: US 9,513,617 B2
(45) Date of Patent: Dec. 6, 2016

(54) INDUSTRIAL CONTROL SYSTEM WITH POSITION OFFSETS EMBEDDED IN REMOTE DEVICES

(71) Applicant: Rockwell Automation Technologies, Inc.

(72) Inventor: Scott A. Pierce, Concord Township, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 569 days.

(21) Appl. No.: 13/644,201

(22) Filed: Oct. 3, 2012

(65) Prior Publication Data
US 2014/0094939 A1    Apr. 3, 2014

(51) Int. Cl.
*G05B 19/18* (2006.01)
*G05B 19/05* (2006.01)

(52) U.S. Cl.
CPC .................. *G05B 19/054* (2013.01)

(58) Field of Classification Search
USPC ............................................. 700/66
See application file for complete search history.

(56) References Cited

U.S. PATENT DOCUMENTS

| | | | |
|---|---|---|---|
| 5,138,868 A * | 8/1992 | Long ................ | G01N 35/1011 73/1.79 |
| 5,724,786 A * | 3/1998 | Singh et al. ..................... | 53/52 |
| 2003/0014322 A1 * | 1/2003 | Kreidler et al. ................ | 705/26 |
| 2006/0224811 A1 * | 10/2006 | Sichner et al. ............... | 710/306 |

* cited by examiner

*Primary Examiner* — Carlos Ortiz Rodriguez
(74) *Attorney, Agent, or Firm* — Boyle Fredrickson, S.C.

(57) ABSTRACT

An industrial control system provides for distributed processing of position related signals by remote I/O modules to correct for spatial offsets of sensors or actuators associated with the I/O modules, the latter which may receive position data and may correct timing signals detected at the I/O modules according to a stored position offset within the I/O modules.

17 Claims, 5 Drawing Sheets

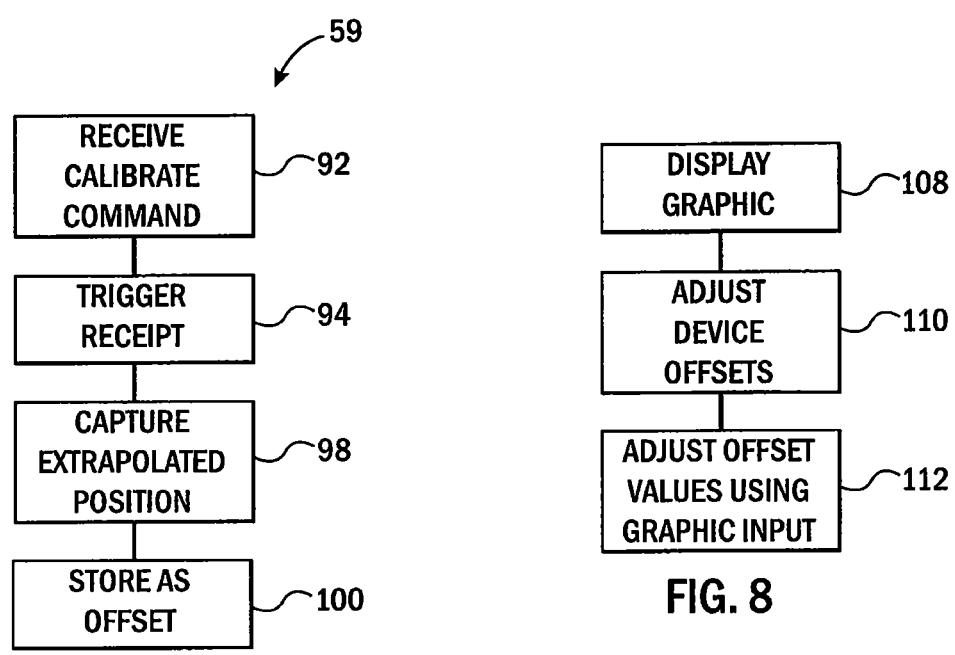

INDUSTRIAL CONTROL SYSTEM WITH POSITION OFFSETS EMBEDDED IN REMOTE DEVICES

CROSS-REFERENCE TO RELATED APPLICATIONS

--

BACKGROUND OF THE INVENTION

The present invention relates to industrial control systems for synchronizing the operation of machines with a moving frame, for example, a conveyor belt or moving web, and in particular to an improved method and apparatus for such synchronization.

Industrial controllers are specialized computer systems used for the control of industrial processes or machinery, for example, in a factory environment. Generally, an industrial controller executes a stored control program that reads inputs from a variety of sensors associated with the controlled process and machine and, sensing the conditions of the process or machine and based on those inputs and a stored control program, calculates a set of outputs used to control actuators controlling the process or machine.

Industrial controllers differ from conventional computers in a number of ways. Physically, they are constructed to be substantially more robust against shock and damage and to better resist extreme environmental conditions than conventional computers. The processors and operating systems are optimized for real-time control and are programmed with languages designed to permit rapid development of control programs tailored to a constantly varying set of machine control or process control applications.

Generally, the controllers have a highly modular architecture, for example, that allows different numbers and types of input and output modules to be used to connect the controller to the process or machinery to be controlled. This modularity is facilitated through the use of special "control networks" suitable for highly reliable and available real-time communication. Such control networks (for example, ControlNet, EtherNet/IP) differ from standard communication networks (e.g. Ethernet) by guaranteeing maximum communication delays by pre-scheduling the communication capacity of the network, and/or providing redundant communication capabilities for high-availability.

As part of their enhanced modularity, industrial controllers may employ I/O modules dedicated to a particular type electrical signal and function, for example, detecting input AC or DC signals or controlling output AC or DC signals. Each of these I/O modules may have a connector system allowing them to be installed in different combinations in a housing or rack along with other selected I/O modules to match the demands of the particular application. Multiple or individual I/O modules may be located at convenient control points near the controlled process or machine to communicate with a central industrial controller via the special control network.

Often industrial control systems are applied to processes that includes a moving frame of reference such as: a conveyor belt, a web of printed material, a turntable, or the like. In such cases, the moving frame may be instrumented so that its position may be accurately determined, for example, with an encoder to provide for a motion signal providing a frame position relative to a predetermined reference location. This motion signal may be used to synchronize the acquisition of data related to the moving frame and/or the control of actuators that must operate relative to the moving frame.

In such control systems, the associated sensors and actuators (control devices) may be distributed in space at different locations with respect to the moving frame and thus the control of these devices must be corrected for their spatial offsets. This is normally done by means of offset variables defined in the control program, each offset variable representing the spatial offset of the control devices.

Particularly for high-speed processes, it may be necessary to adjust the position of the sensors or actuators with respect to the moving frame to allow sufficient time for control actions to be implemented. Such adjustments are complicated by the need to review the control program and identify the offset variables to make appropriate changes to these variable values.

SUMMARY OF THE INVENTION

The present invention allows the offset variables associated with sensors or actuators to be distributed to devices (such as I/O modules) that may be remote from the industrial controller. In this way, the I/O modules may receive and transmit actual position values (corrected for any offset) greatly simplifying the operation and transparency of the control program as well as facilitating physical repositioning of the sensors and actuators. By implementing the correction process at the remote devices, position values can be broadcast simultaneously to multiple remote devices indicating, for example, an actual position value, and the offset adjustments which are unique to the remote devices performed logically at the remote devices themselves.

Specifically, the present invention, in one embodiment, provides an I/O module for an industrial controller, the I/O module having an input for receiving an electrical signal indicating a sensed condition relative to a moving frame and a network interface adapted to communicate with an industrial control network to receive periodic motion data indicating position of the moving frame with respect to a frame reference. The I/O module further includes an electronic computer communicating with a memory to execute a stored program contained in the fixed medium of the memory to:

(1) extrapolate the periodic motion data to a current position value;

(2) capture the current position value at a time of the electrical signal indicating the sensed condition; and (3) correct the captured current position value by a stored offset value indicating a difference between spatial positions of the reference of the periodic motion data and the sensor providing the electrical signal indicating a sensed condition.

It is thus a feature of at least one embodiment of the invention to simplify the process of industrial control in the context of a moving reference frame by allowing I/O devices to transmit frame-referenced positions eliminating the need for position corrections in the control program itself.

The I/O module may include a housing holding the input, network interface, electronic computer and memory wherein the input comprises a plurality of screw terminals allowing attachment of the sensor as housing, and wherein the stored offset value is stored in the memory.

It is thus a feature of at least one embodiment of the invention to perform these position calculations in the commonly distributed form-factor of a conventional I/O module.

The network interface may be adapted to implement connected messaging between the I/O module and a remote device, the connected messaging pre-allocating network communication capacity among connections wherein the electronic computer further executes to open at least one connection between the I/O module and a device providing the periodic motion data for communication of the periodic motion data.

It is thus a feature of at least one embodiment of the invention to provide a mechanism for reliably transmitting position information to remote devices necessary to permit remote production of frame-referenced position data.

The I/O module may transmit the corrected captured current position value on the network to a remote device or may execute an instruction associated with a predetermined trigger position value according to a time of matching of the corrected current position value to provide an electrical signal on an output of the I/O module at the time of matching.

It is thus a feature of at least one embodiment of the invention to allow the simplification of operating in frame-referenced positions to be used for both inputs to and outputs from the industrial controller.

The electronic computer may further execute to receive over the network interface the offset value for storage in the memory.

It is thus a feature of at least one embodiment of the invention to allow a centralization of the setting of offset values.

Alternatively, or in addition, the I/O module may receive a calibration command over the network interface and in response to that command may:
  (a) extrapolate the periodic motion data to a current position value;
  (b) capture a current position value as triggered by the electrical signal indicating the sensed condition; and
  (c) store the captured current position value as the stored offset value.

It is thus a feature of at least one embodiment of the invention to allow automatic or semiautomatic calibration of sensors or sensor systems to their relative positions.

The electronic computer may further execute to change the stored offset value according to a time-varying correction signal.

It is thus a feature of at least one embodiment of the invention to accommodate drifting of the position signal or mechanical changes in the frame that may occur over time.

The time-varying correction signal may be derived from a model executed by the electronic computer related to dimensional changes and/or slippage of the frame with respect to the periodic motion data and/or may be derived from data received on the network interface from a remote device sensing dimensional changes or slippage of the frame with respect to the periodic motion data.

It is thus a feature of at least one embodiment of the invention to improve the accuracy of calculated offsets by dynamic correction.

The invention may be used, in one embodiment, with a configuration device providing a network interface adapted to communicate with the industrial control network and having an electronic computer communicating with a memory to execute a stored program contained in the memory to communicate with the I/O modules to transmit one of:
  (1) an offset value to the I/O modules to provide the stored offset values;
  (2) a calibration command instructing the I/O module to cause the I/O module to:
    (a) extrapolate the periodic motion data to a current position value;
    (b) capture a current position value as triggered by the electrical signal indicating the sensed condition;
    (c) store the captured current position value as the stored offset value.

It is thus a feature of at least one embodiment of the invention to work in conjunction with other control devices such as the industrial controller to allow the setting of offsets through a configuration program or the like.

The electronic computer of the configuration device may further execute to provide an output producing a graphical representation of the frame and sensor allowing movement of the graphical representation of the sensor by a user input to change the stored offset value and further to respond to such changes by transmitting to the I/O modules one of:
  (1) the changed offset value to the I/O modules to provide the stored offset values;
  (2) a calibration command instructing the I/O modules to:
    (a) extrapolate the periodic motion data to a current position value;
    (b) capture a current position value as triggered by the electrical signal indicating the sensed condition;
    (c) store the captured current position value as the stored offset value.

It is thus a feature of at least one embodiment of the invention to allow improved adjustment of sensor positions when devices communicate by means of frame-referenced position information.

These particular objects and advantages may apply to only some embodiments falling within the claims and thus do not define the scope of the invention.

BRIEF DESCRIPTION OF THE DRAWINGS

FIG. 7 is a flowchart similar to FIGS. 5 and 6 showing an automatic offset calculation process that may be implemented with the present invention;

FIG. 8 is a flowchart representing the steps of adjusting stored offset values using a graphic display;

DETAILED DESCRIPTION OF THE PREFERRED EMBODIMENT

Figure 1:
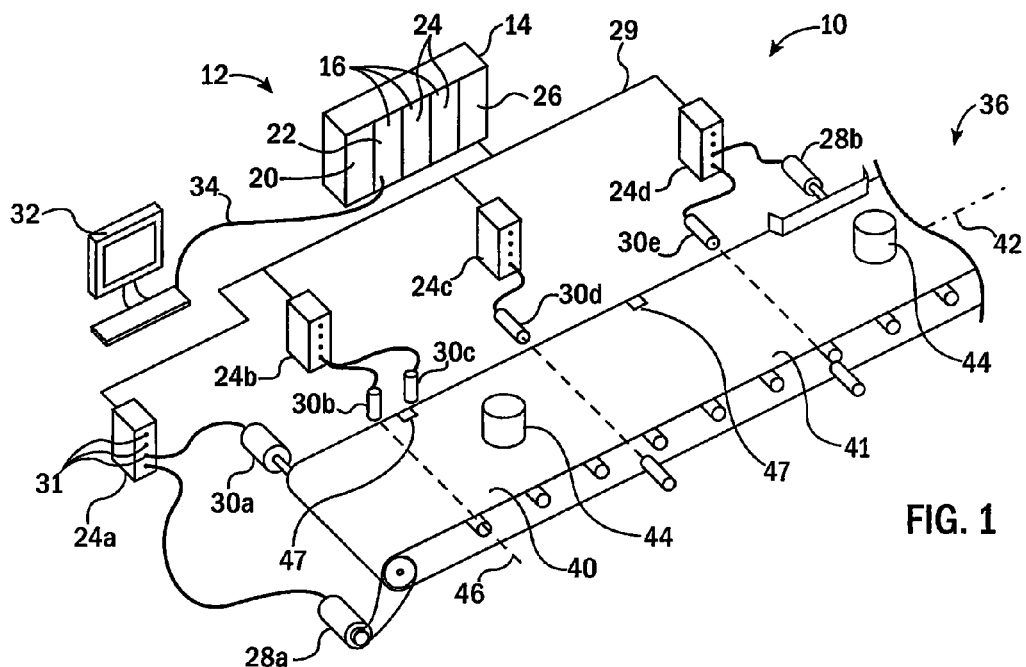
FIG. 1 is a simplified perspective view of an industrial control system for providing control relative to a moving frame of a conveyor belt having products placed thereon showing an industrial controller communicating with a programming terminal and with multiple I/O modules associated with sensors or actuators.

Referring now to FIG. 1, an industrial control system 10 may include an industrial controller 12 providing generally a housing 14 having an internal bus (not shown), the latter providing intercommunication between multiple modules 18 installed in the housing 14. The modules 16 may include, for example, a power supply module 20, a controller 22, one or more I/O modules 24, and a network component 26. The network component 26, or the controller 22, may communicate on an industrial control network 29 of a type providing connected messaging which provides assurances of message completion time, low latency, and lost message detection necessary for industrial control. The industrial control network 29 may be, for example, ControlNet or EtherNet/IP, well-known open standards.

The industrial control network 29 may in one embodiment join industrial controller 12 to remote I/O modules 24a-d each providing a housing supporting on its front face a series of releasable screw terminals 31 or the like for attaching the I/O module 24 via wiring to any of associated actuators 28a-b and sensors 30a-e as will be discussed below.

A configuration terminal 32 may communicate with the controller 22 and/or the remote I/O modules 24a-d over the industrial control network 29 or via a dedicated communication channel 34, for example, connecting with the controller 22. The configuration terminal 32 may be a standard desktop or laptop computer and include a keyboard, display screen, and the like to permit the entry and display of data and the operation of a configuration program by a human operator as will be described below.

Referring still to FIG. 1, the industrial control system 10 may work in conjunction with a controlled system 36 providing a moving frame 40, for example a conveyor belt 41 having an upper surface that may move along a frame axis 42. It will be understood that the moving frame 40 need not be a conveyor belt 41 but could be other moving systems such as turntables, printed webs or the like. In this example, actuator 28a may be a motor for moving the conveyor belt 41 controlled by I/O module 24a and actuator 28b may be, for example, a pneumatic piston and associated air valve for ejecting product 44 from the surface of the conveyor belt 41 based on a signal from I/O module 24d. In this example, sensor 30a may be an optical encoder providing a position signal to the I/O module 24a indicating a relative positioning of the frame 40 with respect to an arbitrary reference line 46 as will be discussed below.

Sensor 30b and 30c may, for example, be optical sensors that may detect a registration mark 47 on the surface of the conveyor belt 41. Registration mark 47 when aligned with sensors 30a may provide for a signal to I/O module 24b used to reset the position signal from sensors 30a to a predetermined value (typically zero) when the registration mark 47 crosses the reference line 46. Multiple reference marks 47 may establish a set of repeating frames as will be discussed below. Different positions of the conveyor belt 41 may be keyed to particular control actions, for example, associated with products 44 in each frame.

Sensors 30d and 30e may also provide, for example, optical sensors positioned to project or receive a beam of light parallel to and above the surface of conveyor belt 41 to detect the passage of product 44. Such a system may, for example, detect proper location of product 44 within a frame defined by registration marks 47 and eject particular product 44 from the conveyor belt 41 based on the location of the product 44 determined by execution of instructions of the control program executed by the industrial control system 10 or by the I/O module 24 itself.

Figure 2:
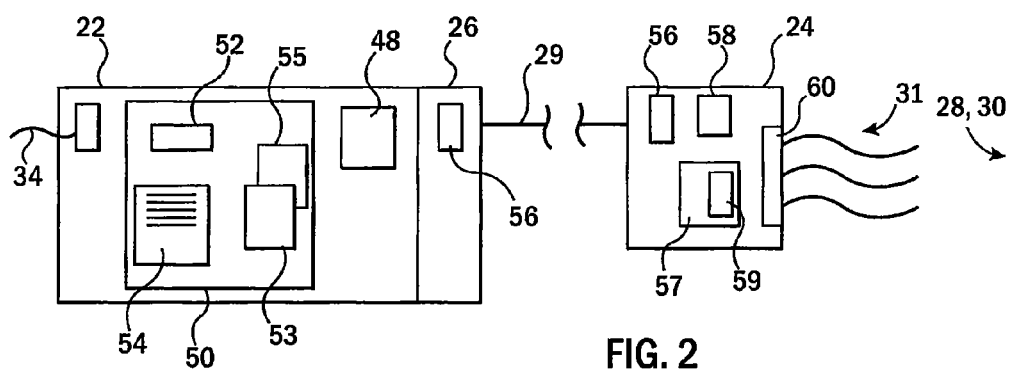
FIG. 2 is a block diagram of the industrial controller and a representative I/O module of FIG. 1 showing the principal components of the same including: processors, network cards, and electronic memories holdings stored programs and data tables.

Referring now to FIG. 2, generally, the controller 22 may include a processor 48 communicating with a stored memory 50 to execute an operating system program 52 controlling the operation of the controller 22, and a control program 54 describing a desired control of the controlled system 36 (e.g. industrial machinery or process equipment), the control program 54 typically being unique to a given industrial application of the industrial control system 10. The control program 54 may be written in a variety of different languages including, for example, relay ladder language, function block language and structured text language, all well known in the art. The memory 50 may also include data tables, for example, I/O tables 53 (holding current states of signals input to and output from the I/O modules 24) and frame tables 55 (holding frame-relative positions used for triggering outputs from I/O modules 24) as used by the control program 54 and as will be described below.

Controller 22 may communicate over the backplane or an inter-processor communications bus (not shown) with the network component 26, the latter including network interface circuitry 56 providing for execution of low-level electrical protocols on the industrial control network 29. Similar network interface circuitry 56 may be provided in the I/O modules 24 to communicate with an internal processor 58 that may, for example, execute operating program 59 in memory 57. The internal processor 58 may also communicate with interface circuits 60 that may provide output signals to the actuators 28 and receive input signals from the sensors 30. The output signals to the actuators 28 may be driven by signals or instructions (for example keyed to positions or times) received from the controller 12 executing a control program 54. The input signals from sensors 30 may input variables for the control program 54 as possibly time stamped or position stamped as will be described below.

Figure 3:
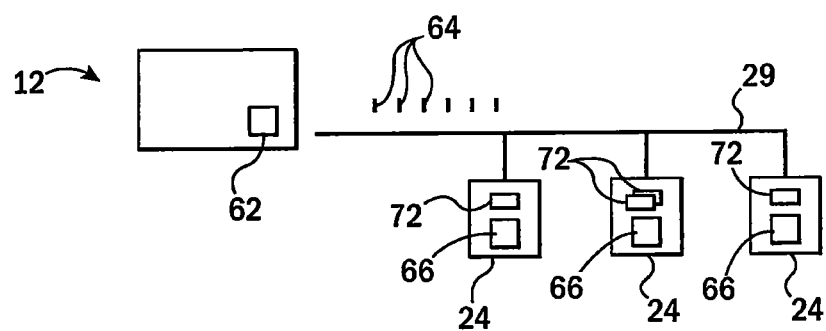
FIG. 3 is a diagrammatic representation of the transmission of periodic motion data to elements of the control system of FIG. 1 necessary for communication in frame-relative data and showing the placement of motion interpolators in the industrial controller and I/O modules.

Referring now to FIG. 3, the controller 12 will implement a motion component 62 that establishes connections with the various I/O modules 24 over the industrial control network 29 to reliably transmit periodic motion data 64 to each of the I/O modules 24. This periodic motion data 64 is obtained by reading the sensor 30a (through I/O module 24a also through a connection as shown in FIG. 1) and provides periodic samples of the position data from sensor 30a on a coarse update interval which may be on the order of milliseconds. The periodic motion data 64 may be scheduled to be delivered promptly and/or may be time stamped to provide for accurate samplings of the motion of the surface of the conveyor belt 41 at a precise time value. The periodic motion data 64, as noted above, may be zeroed or reset by the sensor 30a on a periodic basis as driven by registration marks 47.

Figure 4:
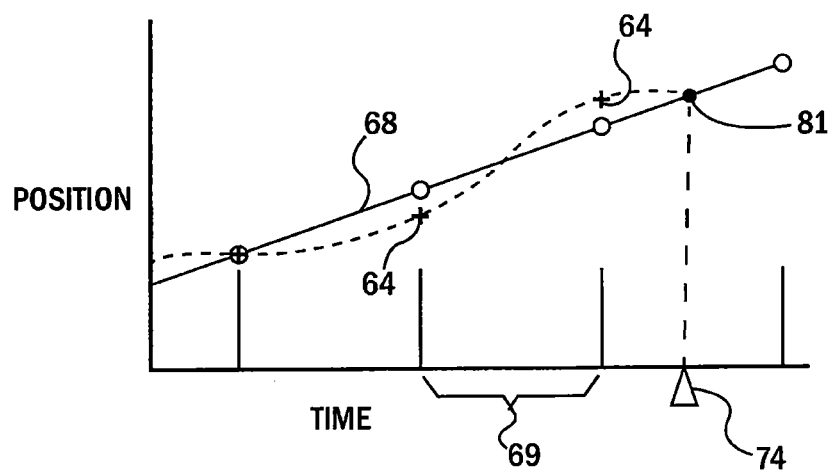
FIG. 4 is a representation of the operation of a motion interpolator for converting the periodic motion data into current position values.

Referring also to FIG. 4, each of the I/O modules 24 may include a fine interpolator 66 which interpolates the periodic motion data 64 into a current position value 68. The current position value 68 attempts to estimate the position of the conveyor belt 41 between arrivals of the periodic motion data 64 based on its recent history and may provide for step or gradual corrections when each periodic motion datum 64 arrives on the coarse update interval 69. In this way, each of the I/O modules 24 may have a high resolution current position value 68 without overwhelming the bandwidth of the industrial control network 29 with the transmission of position information. The distribution of accurate position data is important to the present invention's ability to work in frame-referenced coordinates on a distributed basis.

Figures 5, 6:
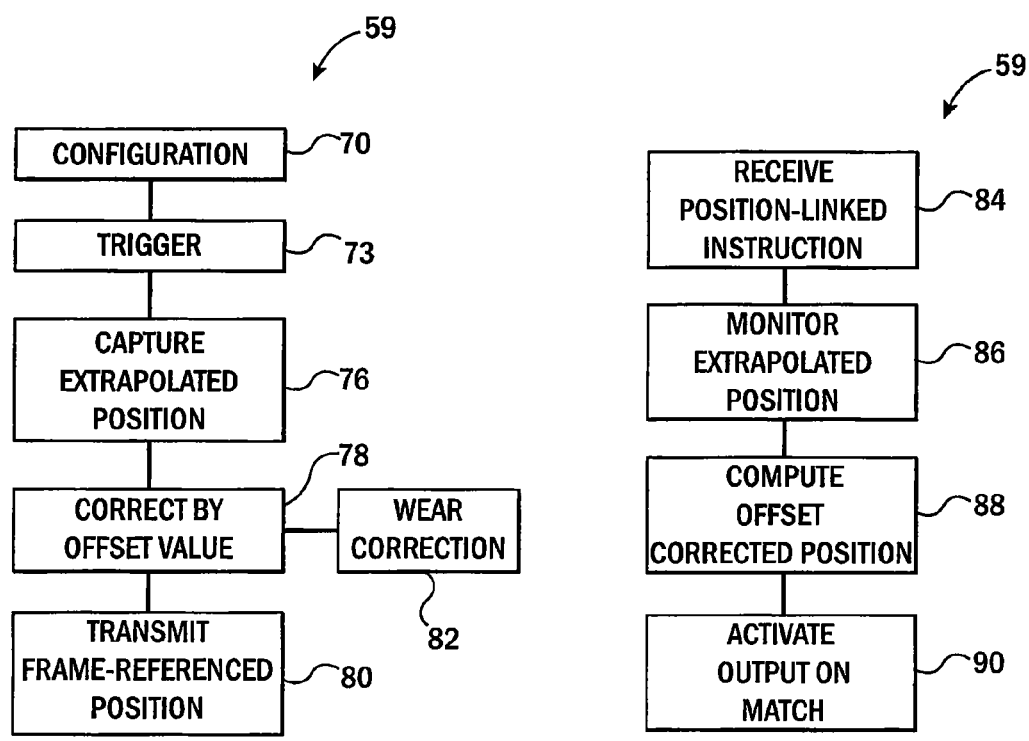
FIG. 5 is a flowchart executable by the I/O modules of FIG. 1 showing a distributed and controller-remote determination of a corrected position value for transmission of sensor data.
FIG. 6 is a figure similar to that of FIG. 5 showing use of the corrected position value for remote instruction execution.

Referring now to also FIG. 5, in operation, the operating program 59 of the I/O modules 24 may receive configuration information as indicated by process block 70. This configuration information, is typically provided at the initialization of the industrial control system 10 and provides the I/O module 24 with information about its network addresses and operating modes and the like as is well known in the art. In addition, the configuration information may include an offset value 72 associated with each sensor 30b-30e that is involved in sensing action relative to the moving frame 40 and actuator 28b that must produce an action relative to the position of the moving frame 40. One or more offset values 72 are stored in memory in the I/O module 24 and define a spatial separation between the reference line 46 and the particular sensor 30 or actuator 28 associated with that I/O module 24. This offset value 72, as will be described below, allows each particular sensor 30 to report actions in terms of frame-referenced position rather than time or position reported by the sensor 30a. Similarly, this offset value 72 allows each actuator 28 to provide actions in terms of frame-referenced position rather than time or position reported by the sensor 30a.

Referring to FIGS. 1, 4, and 5, at a time 74, the operating program 59 of the I/O module 24 may receive an electrical signal from an associated sensor element, such as sensor 30d as indicated by process block 73. Per process block 76, the operating program 59 may in response capture the current position value 68 extrapolated from the periodic motion data 64 to essentially "position stamp" the signal received at process block 73 with a position value 81 relative to a reference line 46. At process block 78, this position value 81 is adjusted by the stored offset value 72 so that the position stamping of the trigger signal is changed to a frame-referenced position relative to the given sensor 30 (e.g. sensor 30d). Thus, for example, referring to FIG. 1, when product 44 crosses the beam of sensor 30d, the I/O module 24c may report the position of the product 44 with a frame-referenced position value indicating the position of the product relative to a beginning of a frame described by registration mark 47. This adjustment process simply subtracts (or adds) the offset value 72 to the position value 81 thus effectively converting the current position value 81 derived from sensor 30a to a local position value for the sensor 30d.

At process block 80, this frame-referenced signal may then be transmitted to the industrial controller 22 for use by the control program 54 without any need to convert or correct that value. In other words the control program 54 may treat the received position stamping as a frame-referenced value.

It will be appreciated that different multiple I/O modules 24 may be the source of periodic motion data 64 and that a given I/O module 24 may select one such source and use an offset referenced from that source. Alternatively or in addition, an I/O module may use different sources of periodic motion data 64 associated with different tasks and may use different offset value for each.

Referring still to FIG. 5, the stored offset value 72 may be periodically corrected as indicated by process block 82 to accommodate mechanical slippage or wear in the system. For example, slippage in the conveyor belt 41 with respect to the encoder sensor 30a can be accommodated by detection of mis-registration of the registration marks 47 by sensor 30b sending a correction signal to the offset values stored in each I/O module 24. Alternatively, belt stretching of the conveyor belt 41 may be detected, for example, by use of sensors 30b and 30c detecting changes in the differences values of periodic motion data 64 triggered by registration marks 47 passing by the sensors 30b and 30c that would indicate distortion or stretching of the belt with wear. Alternatively, or in addition, a model of such wear or stretching (for example providing a stretch amount being a percentage of the cumulative motion of the conveyor belt 41 determined from the periodic motion data 64) may be used to make this correction.

Referring now to FIG. 6, an output I/O module 24d associated with actuator 28b may receive a positioned-linked instruction (for example, holding a frame-referenced position value provided by the frame table 55) as indicated by process block 84. This position-linked instruction, for example, may instruct the I/O module 24d to activate the actuator 28b when the reference frame 40 of conveyor belt 41 is in a certain position with respect to the actuator 28b. At process block 86 the current position value 68 is determined as described above (as decoded by the fine interpolator 66 in the I/O module 24d) and, at process block 88, this position value 68 is corrected as discussed above with respect to process block 78 (and optionally also including the long-term correction of process block 82) by offset value 72. At process block 90, the corrected position is compared to a frame-referenced position embedded in the instruction received at process block 84 and the actuator 28b actuated by outputting an electrical signal an actuating on the terminals of the I/O module 24d to cause actuation of the actuator 28 at the appropriate time when those two values match. In this situation, it should be noted that the position value 68 may be simply broadcast to multiple I/O modules other than I/O module 24d without correction or offset by the transmitting device, greatly simplifying this synchronization process. This can be particularly valuable in a peer-to-peer communication, for example, where one I/O module 24 transmits the position value and other I/O modules consume it making the necessary offset adjustments.

Figure 10:
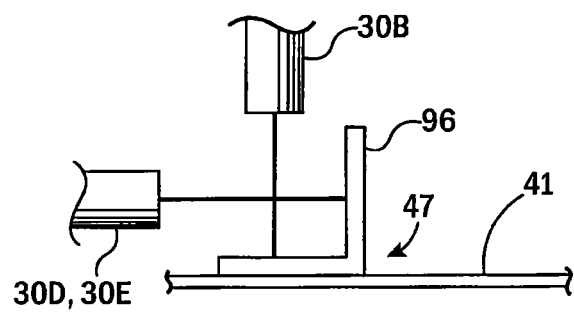
FIG. 10 is a side elevational view of a fixture that may be used for automatic offset calibration in the example of FIG. 1.

Referring now to FIG. 7, the present invention in one embodiment may allow for automatic generation of the offset value 72 (or automatic periodic calibration of those offset values 72). In this process, the I/O module 24 may receive, as indicated by process block 92 of program 59, a calibration command, for example, from the controller 12 (shown in FIG. 1). A specially prepared trigger signal may then be received by the I/O module 24 to indicate a point of the calibration as indicated by process block 94. Referring momentarily to FIG. 10, in one embodiment, this trigger signal may be produced by a fixture 96 positioned on the surface of the conveyor belt 41 either on the registration mark 47 or to trigger, for example, sensor 30b aligned with reference line 46 in lieu of the registration mark 47. The fixture 96 then triggers sensors 30d and 30e to be calibrated. The fixture 96 may be eliminated in an alternative embodiment, for example, by sensors 30d and 30e that can simultaneously detect calibration and other reference marks on the moving frame 40, for example, by having two sensing surfaces.

At the time of the triggering, as indicated by process block 98, each I/O module 24 involved in the calibration process may capture the current position value 68 from its fine interpolator 66 as indicated by process block 98. The value of current position value 68, uncorrected by offset value 72, is then stored as a new offset value 72 per process block 100.

Figure 9:
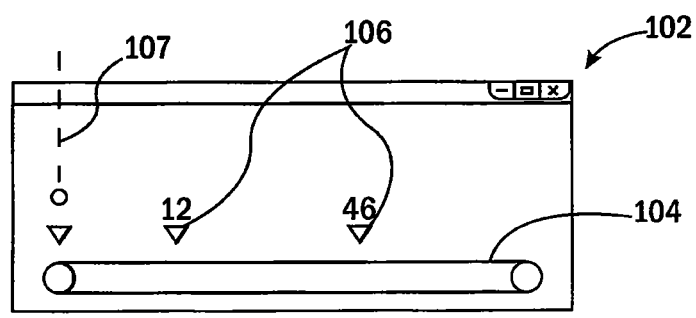
FIG. 9 is a representation of the display screen showing a graphical representation used for adjusting the offset values.

Referring now to FIGS. 1, 8 and 9, a program executing on the configuration terminal 32 or on the controller 12 may present a graphic display 102 on a standard human machine interface (not shown) or on terminal 32. The graphic display 102 provides a representation 104 of the moving frame 40 (shown in FIG. 1) together with symbols 16 of various sensors or actuators providing for offset values 72 associated with each of the sensors or actuators. The particular numeric values of the offset values 72 may be represented by numbers positioned above the symbols 106. The reference line 46 may also be represented by a display line 107.

The process of outputting this graphic display 102 is indicated by the process block 108. At process block 110 the actuator or sensors may be physically moved. Such movement may be for the purpose of optimizing the process or adjusting the timing required between devices.

After the physical movement of the sensors or actuators, per process block 112, the user may provide inputs to the device displaying the graphic display 102 (e.g. the controller 12 or configuration terminal 32), for example, via a touchscreen or mouse or similar device allowing the symbols 106 to be moved along the frame representation 104 with respect to the reference display line 107 with their position digits changing accordingly. The new physical offsets of the sensors or actuators with respect to the reference line 46 as measured with a ruler or the like may be used to guide this process of moving the symbols 106 may be used to change the offset values in the associated I/O modules per process block 112. Alternatively, movement of the symbols 106 may invoke an auto calibration process implemented by process block 112 and new offset value 72 measured to update the symbols 106 automatically. In this way the position of sensors 30 may be readily adjusted without delving into the control program 54 and changing values in the control program 54.

It will be appreciated, from the above description, that the sensors 30 in I/O modules 24 may in fact be integrated together with the functionality of the I/O modules within the same housing as the sensor or the sensor may be integrated into the I/O modules 24 so long as they may each be moved as discussed above.

It will be further appreciated that the position signal from encoder sensor 30a may periodically "roll over", for example, having a range from 0 to 1024 or other numeric range above which the position signal roles over to zero again and below which the signal rolls under to 1024 with the effect of generating periodic reference lines 46 over the reference frame 40. In this case, each sensor or actuator may have an offset value associated with its closest reference line 46 to permit periodic activities in displaced reference frames still keyed to a relative location of the reference frame. This process may be handled by the controller which generates a master axis.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

What I claim is:

1. An I/O module for industrial control comprising:
   an input for receiving a trigger signal from a first sensor at a first stationary location, the trigger signal indicating passage of an object located stationary in a moving frame, the moving frame being defined by detectable registration marks spaced apart on a moving conveyor;
   a network interface adapted to communicate with an industrial control network to receive periodic motion data from an encoder indicating sensed positions of the moving frame by sensing positions of the moving conveyor with respect to a reference line, the reference line being defined by a second sensor at a second stationary location adapted to detect passage of a detectable registration mark on the moving conveyor; and
   an electronic computer communicating with a memory to execute a stored program contained in a fixed medium of the memory to:
   (1) interpolate the periodic motion data to determine a current position value of the moving conveyor between arrivals of the periodic motion data;
   (2) extrapolate the current position value to determine an extrapolated current position value;
   (3) capture the extrapolated current position value at a time of the trigger signal indicating passage of the object to determine a captured extrapolated current position value; and (4) correct the captured extrapolated current position value by a spatial offset value stored in the memory to determine a corrected captured extrapolated current position value, the spatial offset value being defined by a spatial separation between the reference line and the first sensor at the first stationary location providing the trigger signal.

2. The I/O module of claim 1 further including a housing holding the input, network interface, electronic computer and memory and wherein the input comprises a plurality of screw terminals allowing attachment of the sensor as housing.

3. The I/O module of claim 2 wherein the network interface is adapted to implement connected messaging between the I/O module and a remote device, the connected messaging pre-allocating network communication capacity among connections and wherein the electronic computer further executes to open at least one connection between the I/O module and a device providing the periodic motion data for communication of the periodic motion data.

4. The I/O module of claim 2 wherein the electronic computer further executes the step of:
transmitting the corrected captured extrapolated current position value on the network to a remote device.

5. The I/O module of claim 2 wherein the electronic computer further executes the step of:
executing an instruction associated with a predetermined position value according to a time of matching of the corrected captured extrapolated current position value to provide an electrical signal on an output of the I/O module at the time of matching.

6. The I/O module of claim 3 wherein the electronic computer further executes to receive over the network interface the spatial offset value for storage in the memory.

7. The I/O module of claim 3 wherein the electronic computer further executes to receive a calibration command over the network interface and in response to that command to:
capture a current position value as triggered by the signal indicating the passage of the object; and
store the captured current position value as the spatial offset value.

8. The I/O module of claim 1 wherein the electronic computer further executes to change the spatial offset value according to a time varying correction signal.

9. The I/O module of claim 8 wherein the time varying correction signal is derived from a model executed by the electronic computer related to dimensional changes and/or slippage of the frame with respect to the periodic motion data.

10. The I/O module of claim 8 wherein the correction signal is derived from data received on the network interface from a remote device sensing dimensional changes or slippage of the frame with respect to the periodic motion data.

11. An industrial control system comprising:
at least one I/O module providing an input for receiving a trigger signal from a first sensor at a first stationary location, the trigger signal indicating passage of an object located stationary in a moving frame, the moving frame being defined by detectable registration marks spaced apart on a moving conveyor;
a network interface adapted to communicate with an industrial control network to receive periodic motion data from an encoder indicating sensed positions of the moving frame by sensing positions of the moving conveyor with respect to a reference line, the reference line being defined by a second sensor at a second stationary location adapted to detect passage of a detectable registration mark on the moving conveyor;
an electronic computer communicating with a memory to execute a stored program contained in the memory to:
(1) interpolate the periodic motion data to determine a current position value of the moving conveyor between arrivals of the periodic motion data;
(2) extrapolate the current position value to determine an extrapolated current position value;
(3) capture an extrapolated current position value as triggered by the trigger signal indicating the passage of the object to determine a captured extrapolated current position value;
(4) correct the captured extrapolated current position value by a spatial offset value stored in the memory to determine a corrected captured extrapolated current position value, the spatial offset value being defined by a spatial separation between the reference line and the first sensor at the first stationary location providing the trigger signal; and
a configuration device providing a network interface adapted to communicate with the industrial control network and having an electronic computer communicating with a memory to execute a stored program contained in the memory to communicate with the at least one I/O modules to transmit one of:
(1) the spatial offset value to the I/O modules to provide the spatial offset values stored in the memory;
(2) a calibration command instructing the I/O module to cause the I/O module to:
(a) capture a current position value as triggered by the trigger signal indicating the passage of the object; and
(b) store the captured current position value as a stored spatial offset value.

12. The industrial control system of claim 11 wherein the electronic computer of the configuration device further executes to provide an output producing a graphical representation of the frame and sensor allowing movement of the graphical representation of the sensor by a user input to change the stored spatial offset value and further to respond to such changes by transmitting to the at least one I/O modules one of:
(1) a changed spatial offset value to the I/O modules to provide the stored spatial offset values;
(2) a calibration command instructing the I/O modules to:
(a) capture a current position value as triggered by the trigger signal indicating the passage of the object; and
(b) store the captured current position value as a stored spatial offset value.

13. The industrial control system of claim 11 wherein the configuration device is an industrial controller executing a stored user-defined control program to exchange input and output data with the I/O module.

14. The industrial control system of claim 13 wherein the control program is a program generated using a programming language selected from the group consisting of relay ladder logic, structured text, and a sequential function chart.

15. The industrial control system of claim 11 further including a device generating the periodic motion data comprising:
an input for receiving an electrical signal indicating a position of the moving frame;
a network interface adapted to communicate with an industrial control network; and an electronic computer communicating with a memory to execute a stored program contained in the memory to periodically transmit the position of the moving frame received on the input.

16. The industrial control system of claim 15 wherein the network interfaces are adapted to implement connected messaging between the I/O module and the configuration device, the connected messaging pre-allocating network communication capacity among connections and wherein the electronic computer of the configuration device further executes to open connections between the I/O module and the configuration device.

17. An I/O module for industrial control comprising:
an input for receiving a trigger signal from a first sensor at a first stationary location, the trigger signal indicating passage of an object located stationary in a moving frame, the moving frame being defined by detectable registration marks spaced apart on a moving conveyor;
an output for outputting an electrical signal to actuate an actuator;
a network interface adapted to communicate with an industrial control network to receive periodic motion data from an encoder indicating sensed positions of the moving frame by sensing positions of the moving conveyor with respect to a reference line, the reference line being defined by a second sensor at a second stationary location adapted to detect passage of a detectable registration mark on the moving conveyor and to receive an instruction for an action to occur at a trigger position with respect to the reference line; and
an electronic computer communicating with a memory to execute a stored program contained in a fixed medium of the memory to:
(1) interpolate the periodic motion data to determine a current position value of the moving conveyor between arrivals of the periodic motion data;
(2) extrapolate the current position value to determine an extrapolated current position value;
(3) capture the extrapolated current position value at a time of the trigger signal indicating passage of the object to determine a captured extrapolated current position value;
(4) correct the extrapolated current position value by a spatial offset value stored in the memory to determine a corrected captured extrapolated current position value, the spatial offset value being defined by a spatial separation between the reference line and the first sensor at the first stationary location providing the trigger signal; and
(5) output the electrical signal when the corrected captured extrapolated current position matches the trigger position.

* * * * *